United States Patent
Noda et al.

(10) Patent No.: US 8,435,601 B2
(45) Date of Patent: May 7, 2013

(54) METHOD FOR FORMING CARBON NANOTUBE

(75) Inventors: Suguru Noda, Tokyo (JP); Koji Furuichi, Kyoto (JP)

(73) Assignees: University of Tokyo (JP); Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 13/122,057

(22) PCT Filed: Oct. 28, 2009

(86) PCT No.: PCT/JP2009/068516
§ 371 (c)(1),
(2), (4) Date: Mar. 31, 2011

(87) PCT Pub. No.: WO2010/050517
PCT Pub. Date: May 6, 2010

(65) Prior Publication Data
US 2011/0189394 A1  Aug. 4, 2011

(30) Foreign Application Priority Data

Oct. 29, 2008 (JP) .............................. 2008-278869

(51) Int. Cl.
*C23C 16/26* (2006.01)
*C23C 16/06* (2006.01)

(52) U.S. Cl.
USPC ................ 427/249.1; 427/250; 427/255.7

(58) Field of Classification Search .............. 427/249.1, 427/250, 255.7
See application file for complete search history.

(56) References Cited

U.S. PATENT DOCUMENTS

| | | | |
|---|---|---|---|
| 2002/0102353 A1* | 8/2002 | Mauthner et al. | 427/255.28 |
| 2002/0192141 A1* | 12/2002 | Little | 423/447.1 |
| 2003/0198058 A1 | 10/2003 | Nakayama et al. | 361/498 |
| 2005/0063891 A1* | 3/2005 | Shaffer et al. | 423/447.3 |
| 2005/0207964 A1* | 9/2005 | Kim et al. | 423/447.3 |
| 2009/0246116 A1* | 10/2009 | Dediu et al. | 423/447.3 |
| 2009/0263310 A1* | 10/2009 | Dai et al. | 423/447.3 |
| 2012/0128880 A1* | 5/2012 | Talapatra et al. | 427/249.1 |

FOREIGN PATENT DOCUMENTS

| | | |
|---|---|---|
| JP | 2002-255528 | 9/2002 |
| JP | 2002-270086 | 9/2002 |
| JP | 2005-503273 | 2/2005 |
| JP | 2005-126257 | 5/2005 |
| JP | 2008-105136 | 5/2008 |
| WO | WO 03/027011 | 4/2003 |

OTHER PUBLICATIONS

Matthews, Kristopher D., et al., "Growth modes of carbon nanotubes on metal substrates". Journal of Applied Physics 100, 044309 (2006), pp. 1-10.*

(Continued)

*Primary Examiner* — Bret Chen
(74) *Attorney, Agent, or Firm* — Ostrolenk Faber LLP

(57) ABSTRACT

Disclosed is a method of forming carbon nanotubes on a conductor that covers a portion of a substrate, the method includes depositing a mesh-like conductive member made of Mo or the like on a substrate made of glass or the like, forming a catalyst support, such as $Al_2O_3$, and a catalyst such as Fe or Co on the conductive member, placing the substrate in a carbon-source gas atmosphere, and generating heat with the conductive member for a short period of time to grow nanotubes while avoiding damage to the substrate.

17 Claims, 8 Drawing Sheets

OTHER PUBLICATIONS

Parthangal, Prahalad M., et al., "A generic process of growing aligned carbon nanotube arrays on metals and metal alloys". Nanotechnology 18 (2007) 185605, pp. 1-5.*

Wang, Biao, et al., "Controllable preparation of patterns of aligned carbon nanotubes on metals and metal-coated silicon substrates". J. Mater. Chem., 2003, 13, 1124-1126.*

Zhang, Yong, et al., "Integration and characterization of aligned carbon nanotubes on metal/silicon substrates and effects of water." Applied Surface Science 255 (2009) 5003-5008.*

Beom-Jin Yoon et al., "Fabrication of Flexible Carbon Nanotube Field Emitter Arrays by Direct Microwave Irradiation on Organic Polymer Substrate," JACS Communications, vol. 127, pp. 8234-8235, Journal of American Chemical Society, May 20, 2005 (web publication).

Suguru Noda et al., "Millimeter-Thick Single-Walled Carbon Nanotube Forests: Hidden Role of Catalyst Support," Japanese Journal of Applied Physics, vol. 46, No. 17, pp. L399-L401, Apr. 20, 2007 (online publication).

Y. Shiratori et al., "One-step Formation of Aligned Carbon Nanotube field Emitters at 400° C," Applied Physics Letters, vol. 82, No. 15, pp. 2485-2487, Apr. 14, 2009.

International Search Report issued Feb. 9, 2010 issued in connection with corresponding International Application No. PCT/JP2009/068516.

Kaoru Hasegawa et al., "Conditions and Mechanism of Rapid Growth of Carbon Nanotubes from C2H4 by Fe/Al2O3 Catalyst," Abstract of 72 Annual Meeting of the Society of Chemical Engineers, Feb. 19, 2007.

Hiroshi Sugime et al., "6p-T-3 Vertically Aligned Single-Walled Carbon Nanotube Synthesis by Promoted Pyrolysis of Alcohol," Abstract of 68 Fall Meeting of the Japan Society of Applied Physics, Sep. 4, 2007.

Japanese Office Action dated Jan. 8, 2013 with an English Language Translation, no page numbers.

* cited by examiner 401b 402 102 451 101 403 402 401a us 8,435,601 B2

METHOD FOR FORMING CARBON NANOTUBE

CROSS REFERENCE TO RELATED APPLICATIONS

The present application is a 35 U.S.C. §371 national phase conversion of PCT/JP2009/068516 filed Oct. 28, 2009 and claims priority of JP2008-278869 filed Oct. 29, 2008, both incorporated herein in their entirety.

TECHNICAL FIELD

The present invention relates to a method for forming carbon nanotubes, the method being preferable to form the carbon nanotubes on a conductor covering a portion of a substrate using a short heating time.

BACKGROUND ART

In order to produce various types of electronic equipment using carbon nanotubes, the technology has been proposed in which a substrate is placed in a carbon-source gas atmosphere and heated to make carbon nanotubes grow. A catalyst to make carbon nanotubes grow has been also researched. Such technologies are disclosed in non-patent literatures 1 to 3 below.

Non-patent literature 1 discloses the technology to form a Cr and Co layer on the entire surface of a substrate and expose the substrate to microwaves to make carbon nanotubes grow.

Non-patent literature 2 discloses the technology to make single-walled carbon nanotubes (SWNT) grow within a short time, using a $Fe/Al_2O_3$ catalyst.

Non-patent literature 3 discloses the technology to perform heating at 400° C. for 30 minutes in a carbon-source gas atmosphere in order to form carbon nanotubes on a substrate.

Non-patent literature 1: Beom-Jin Yoon et al, Fabrication of Flexible Carbon Nanotube Field Emitter Arrays by Direct Microwave Irradiation on Organic Polymer Substrate, JACS communications, vol. 127, pp. 8234-8235, Journal of American Chemical Society, May 20, 2005, web publication Non-patent literature 2: Suguru NODA, Kei HASEGAWA, Hisashi SUGIME, Kazunori KAKEHI, Zhengyi ZHANG, Shigeo MARUYAMA and Yukio YAMAGUCHI, Millimeter-Thick Single-Walled Carbon Nanotube Forests: Hidden Role of Catalyst Support, Japanese Journal of Applied Physics, vol. 46, No. 17, pp. L399-L401, Apr. 20, 2007, online publication Non-patent literature 3: Y. Shiratori, H. Hiraoka and Y. Takeuchi, One-step formation of aligned carbon nanotube field emitters at 400° C., Applied Physics Letters, vol. 82, No. 15, Apr. 14, 2003

DISCLOSURE OF INVENTION

For example, if carbon nanotubes are used for a field emission device, it is necessary to make the carbon nanotubes on a conductive material in order to apply voltage to the carbon nanotubes to emit electrons.

Meanwhile, heating is necessary in order to make carbon nanotubes grow. Since a substrate for display and a cheap soda lime glass substrate have a low strain point of about 550° C. to 600° C., technology that does not have any harmful effect on these substrates is needed.

In the technology disclosed in Non-patent literature 3, taking a heat resistance of a substrate into consideration, carbon nanotubes are made to grow at a low temperature of 400° C. However, since the time required for the growth of carbon nanotubes is surprisingly as long as 30 minutes, there is also a demand to shorten the time required for forming the carbon nanotubes.

The present invention solves the aforementioned problems and has the objective of providing a method for forming carbon nanotubes, the method being suitable to form carbon nanotubs on a conductor covering a portion of a substrate in a short heating time.

A method for forming carbon nanotubes according to a first aspect comprises the processes of depositing a conductive member, disposing a catalyst, placing a substrate, and heating, and is configured as follows.

That is, in the process of depositing a conductive member, the conductive member is deposited to cover a portion of the surface of a substrate.

In the process of disposing a catalyst, the catalyst is disposed on the deposited conductive member.

In the process of placing a substrate, the substrate on which the catalyst was disposed is placed in a carbon-source gas atmosphere.

Furthermore, in the process of heating, the conductive member deposited on the substrate in the carbon-source gas atmosphere is heated for a short time to make carbon nanotubes grow from the catalyst.

In the method for forming carbon nanotubes according to the present invention, in the process of depositing the conductive member, the conductive member can be deposited in a linear, comb-like or mesh-like way to cover 0.1 percent to 50 percent of the surface of the substrate.

In the method for forming carbon nanotubes according to the present invention, in the process of depositing the conductive member, conductive thin lines, each having a width of 1 μm to 50 μm, can be deposited in a linear, comb-like or mesh-like way with an interval of 10 μm to 500 μm.

In the method for forming carbon nanotubes according to the present invention, in the process of depositing the conductive member, Mo can be deposited as the conductive member in a linear way; in the process of the catalyst, $Al_2O_3$ can be disposed as a catalyst support to contact the conductive member, and Fe or Co can be disposed as a catalyst to contact the catalyst support.

In the method for forming carbon nanotube according to the present invention, in the process of heating, the conductive member can be heated for a short time less or equal to 10 seconds.

In the method for forming carbon nanotubes according to the present invention, in the process of heating, a pulse-like electric current can be made to flow through the conductive member, thereby heating the conductive member.

Furthermore, in the method for forming carbon nanotubes according to the present invention, in the process of heating, the conductive member can be irradiated with pulse-like electromagnetic waves, thereby heating the conductive member.

The present invention can provide a method for forming carbon nanotubes. This method is suitable for forming the carbon nanotubes on a conductor covering a portion of the substrate in a short heating time.

BEST MODE FOR CARRYING OUT THE INVENTION

Embodiments of the present invention will be described below. The embodiments described below are for an illustrative purpose and do not limit the scope of the invention of the present application. Accordingly, it is possible for a person skilled in the art to employ embodiments in which each or all of these elements are replaced by equivalent(s) thereof, and these embodiments are also encompassed in the present invention.

Figure 1:
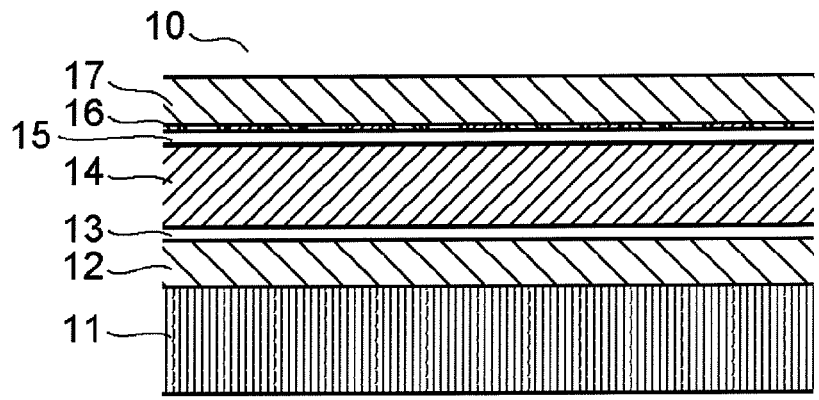
FIG. 1 is a partial cross sectional view of a liquid crystal display panel with a planar light-emitting device using carbon nanotubes.

FIG. 1 is a partial cross sectional view of a liquid crystal display panel with a planar light-emitting device using carbon nanotubes. The description will be made below with reference to FIG. 1.

As illustrated in FIG. 1, a liquid crystal display 10 includes a planar light-emitting device 11, a polarization filter 12, a transparent electrode 13, a crystal liquid 14, a transparent electrode 15, a color filter 16, and a polarization filter 17, which are layered in this order.

The light emitted from the planar light-emitting device 11 is polarized by the polarization filter 12. The crystal liquid 14 functions as a shutter that decides whether to make light pass through depending on the voltage applied between the transparent electrode 13 and transparent electrode 15. In case of the color crystal liquid display, the light that has passed through the crystal liquid 14 passes through the color filter 16 that composes pixels corresponding to each of the three primary colors of light and the polarization filter 17 to be emitted outside.

Figure 2:
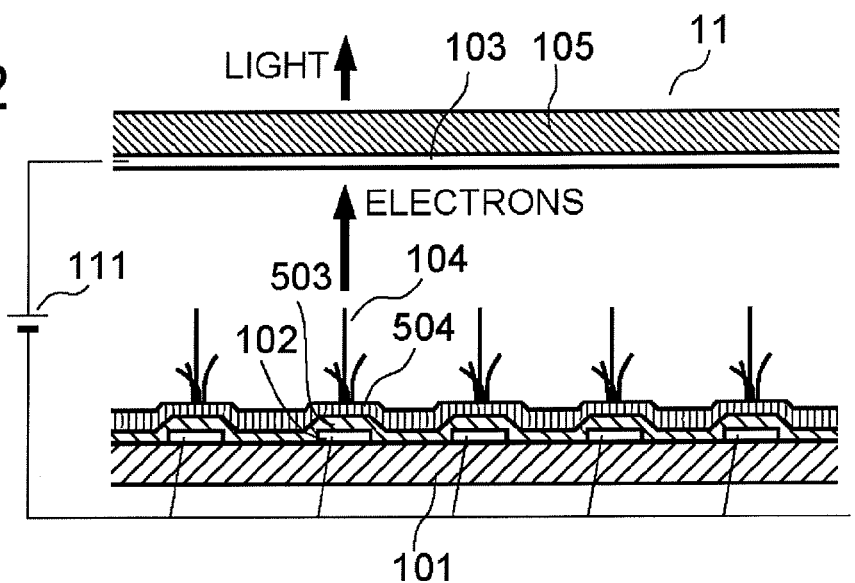
FIG. 2 is a partial cross sectional view illustrating a first embodiment of a planar light-emitting device using carbon nanotubes.

FIG. 2 is a partial cross sectional view illustrating the first embodiment of a planar light-emitting device using carbon nanotubes. The first embodiment will be described below with reference to FIG. 2.

As illustrated in FIG. 2, on a substrate 101 of the planar light-emitting device 11, carbon nanotubes 104 extend from a conductive member 102 functioning as a cathode electrode toward a conductive sheet body 103 functioning as an anode electrode. These carbon nanotubes 104 function as an emitter.

On the conductive member 102, a catalyst support 503 and a catalyst 504 are formed, and the carbon nanotubes 104 grow from the surface of the catalyst 504.

The catalyst support 503 covers the whole of the substrate 101 and conductive member 102, and the catalyst 504 covers the whole of the catalyst support 503. However, as will be described later, by changing a manufacturing process, it is possible to form the catalyst support 503 and catalyst 504 only on the conductive member 102.

In FIG. 2, for easier understanding, thicknesses of the conductive member 102, catalyst support 503 and catalyst 504, and an areal density of the carbon nanotubes 104 and a length of each of the carbon nanotubes 104 are illustrated in an exaggerated form. The same applies to the later embodiments and drawings.

In FIG. 2, the carbon nanotubes 104 grow from the surface of the catalyst 504 on an upper surface of the conductive member 102. Alternatively, it is possible to make the carbon nanotubes 104 grow from the surface of the catalyst 504 adjacent to an edge of the conductive member 102, instead of the surface of the catalyst 504 on an upper surface of the conductive member 102.

The surface of the carbon nanotubes 104 can be over coated with a thin protective layer. The carbon nanotubes 104 may gradually be oxidized and damaged due to the effect of an oxidant and the like generated from a slight amount of residual moisture and the like. In order to prevent this, a thin film of about 1 nm to 5 nm is formed using a conductive substance, such as ZnO, with a high oxidation resistance and a low surface tension. In FIG. 2, for easier understanding, this protective layer is not illustrated. The same applies to the later embodiments and drawings.

When a power source 111 applies a voltage between the conductive member 102 and conductive sheet body 103, electrons are ejected from the tip of the carbon nanotubes 104 to reach the conductive sheet body 103. Passing through the conductive sheet body 103, the electrons excite a fluorescent material 105 deposited on a reverse surface of the conductive sheet body 103 (the reverse surface refers to the surface on the other side of the conductive sheet body 103 than its surface facing the carbon nanotubes 104), thereby making the fluorescent material 105 emit light.

Since the light proceeding downward in FIG. 2 of the light emitted from the fluorescent material 105 is reflected by the reverse surface of the conductive sheet body 103, all the light emitted from the planar light-emitting device 11 proceeds upward in FIG. 2.

According to the present embodiment, the fluorescent material 105's side of the planar light-emitting device 11 contacts the polarization filter 12 of the liquid crystal display 10.

Figure 3:
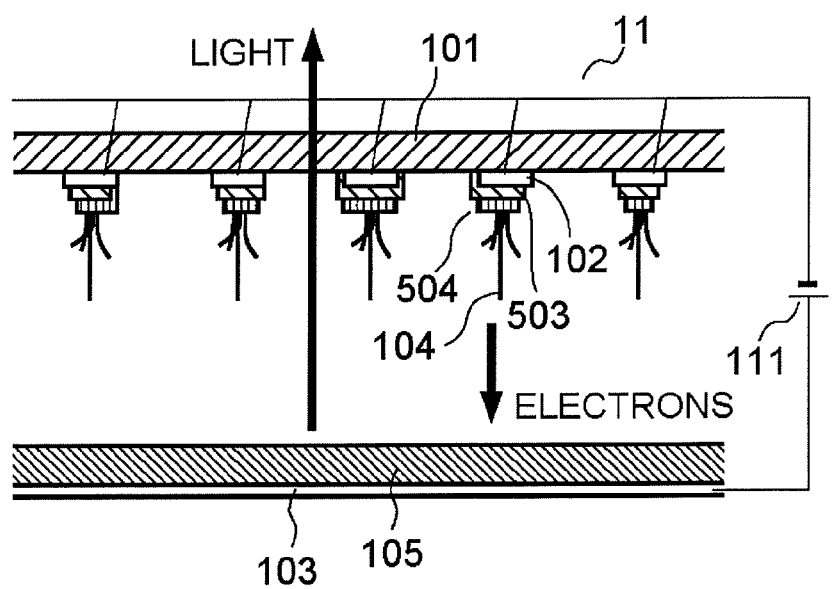
FIG. 3 is a partial cross sectional view illustrating a second embodiment of a planar light-emitting device using carbon nanotubes.

FIG. 3 is a partial cross sectional view illustrating the second embodiment of the planar light-emitting device using carbon nanotubes. The second embodiment will be described with reference to FIG. 3. The configuration in FIG. 3 is different from the configuration in FIG. 2 in the direction of emitted light.

As illustrated in FIG. 3, on the substrate 101 of the planar light-emitting device 11, the carbon nanotubes 104 extend from the conductive member 102 functioning as a cathode electrode toward the conductive sheet body 103 functioning as an anode electrode. These carbon nanotubes 104 function as an emitter. The substrate 101 is made of a transparent material such as soda lime glass.

On the conductive member 102, the catalyst support 503 and catalyst 504 are formed, and the carbon nanotubes 104 grow from a surface of the catalyst 504.

When a power source 111 applies a voltage between the conductive member 102 and conductive sheet body 103, electrons are ejected from the tip of the carbon nanotubes 104 to proceed toward the conductive sheet body 103. The electrons collide with the fluorescent material 105 deposited on the surface of the conductive sheet body 103 (the surface facing the carbon nanotube 104) on the way to the conductive sheet body 103, thereby making the fluorescent material 105 emit light.

Since the light proceeding downward in FIG. 2 of the light emitted from the fluorescent material 105 is reflected by the surface of the conductive sheet body 103, the light emitted from the planar light-emitting device 11 proceeds upward in FIG. 3 and passes through a gap between the conductive members 102 and through the substrate 101.

In FIG. 3, by employing a manufacturing process different from that illustrated in FIG. 2, the light transmission property is improved in such a way that the catalyst support 503 and catalyst 504 cover only the conductive member 102 (a portion of the catalyst support 503 may cover a portion of the substrate 101).

However, even if the catalyst support 503 and catalyst 504 cover the entire surface of the substrate 101 as illustrated in FIG. 2, employing thin and transparent catalyst support 503 and catalyst 504 can improve its light transmission property.

Therefore, in the present embodiment, the substrate 101's side of the planar light-emitting device 11 contacts the polarization filter 12 of the liquid crystal display 10.

In both of the above planar light-emitting devices 11, the conductive members 102 are arranged at a constant interval. Accordingly, the interval of emitting the fluorescent material 105 and the light emitted from the planar light-emitting device 11 have this interval as a spatial period.

Accordingly, if the pixel size of the crystal liquid 14 is made to be an integral multiple of the interval between the conductive members 102, the luminance illuminated to each pixel becomes uniform.

Figure 4:
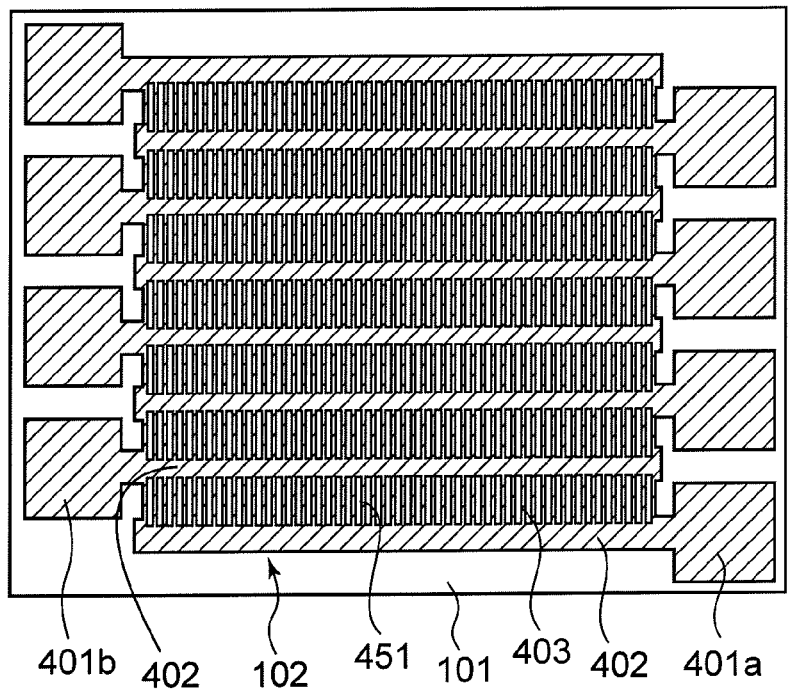
FIG. 4 is an illustration showing one example of a configuration of a conductive member deposited on a substrate.

If a red fluorescent material, a blue fluorescent material and a green fluorescent material can be utilized as the fluorescent material 105, each of these three primary color fluorescent materials will be arranged at a constant interval. For example, if each of the fluorescent materials has a width of 100 μm, this width corresponds to the pixel period of the crystal liquid 14. The interval between the conductive members 102 may be an interval obtained by dividing 100 μm by an integer, such as 100 μm, 50 μm, 25 μm and 20 μm FIG. 4 is an illustration showing one example of a configuration of the conductive member 102 deposited on the substrate 101. A description will be made below with reference to FIG. 4.

As described in FIG. 4, the conductive member 102 deposited on the substrate 101 is composed of pads 401 to which a voltage is applied, core electrodes 402 that convey the applied voltage, and a large number of thin lines 403 that connect the core electrodes 402. The core electrodes 402 and thin lines 403 are arranged in an elongated mesh-like manner and slits 451 are formed by gaps between the core electrodes 402 and thin lines 403.

The width of each of the core electrodes 402 can be properly set according to the arrangement of the pixels of the liquid crystal display.

A cheap material such as soda lime glass can be used for the substrate 101. Mo is typically utilized as the conductive member 102.

According to the mode combining FIGS. 3 and 4, light passes through the slits 451.

In FIG. 4, for easier understanding, widths of each of the thin lines 403 and core electrodes 402 are drawn wider in an exaggerated form.

For practical reasons, it is preferable that the percentage of the area covered by the conductive member 102 be about 0.1 percent to 50 percent, typically less or equal to 10 percent, of the area of the substrate 101.

The length of each of the thin lines 403, that is, the interval between the core electrodes 402 is about 0.1 mm to 2 mm; the width of each of the thin lines 403 is about 1 μm to 50 μm, typically 1 μm to 10 μm; and the interval between the thin lines 403, that is, the width of each of the slits 451 is about 10 μm to 500 μm, typically, 10 μm to 100 μm.

These widths, lengths, intervals and sizes can be properly changed, for example, by corresponding to the pixel size, according to the application.

When the substrate 101 is utilized for the planar light-emitting device 11, a pad 401a on the right in FIG. 4 and a pad 401b on the left in FIG. 4 are both voltage application positions where the voltage is applied to the cathode electrode, both retaining their respective electrical potentials.

However, although the conductive member 102 has conductivity, it is not a perfect conductor. Therefore, if an electric current is made to flow through the thin lines 403, they produce heat.

This exothermic phenomenon is utilized for making the carbon nanotubes 104 of the planar light-emitting device 11 grow.

To make an electric current flow, there are a method to apply the voltage between the pad 401a and pad 401b, a method to expose the conductive member 102 to microwaves, and so on.

One of the typical technologies to form the carbon nanotubes 104 on the conductive member 102 on the substrate 101 will be described in further detail below.

FIGS. 5A, 5B, 5C, 5D, 5E, 5F, 5G, 5H and 5I are partial cross sectional views illustrating a state at each step of the process to form the carbon nanotubes 104 on the conductive member 102 on the substrate 101. A description will be made with reference to these Figs.

Figure 5A:
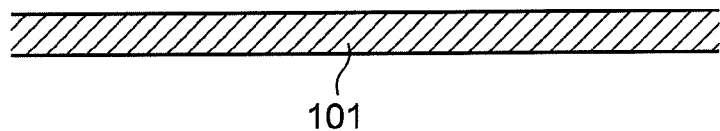
FIG. 5A is a partial cross sectional view illustrating a state at a step of a process to form carbon nanotubes on a conductive member of a substrate.
Figure 5B:
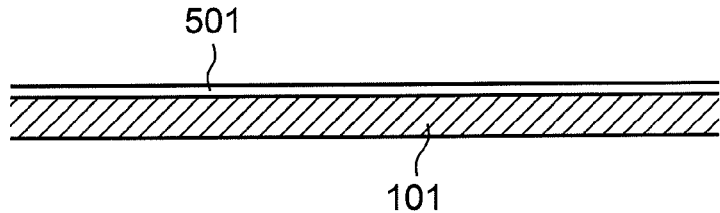
FIG. 5B is a partial cross sectional view illustrating a state at a step of a process to form carbon nanotubes on a conductive member of a substrate.
Figure 5C:
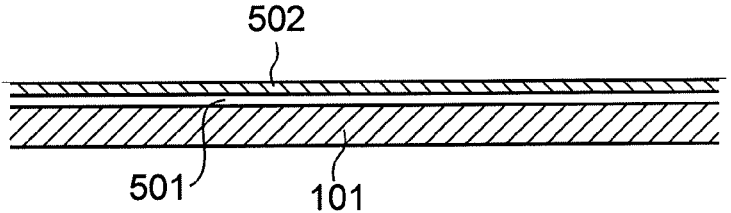
FIG. 5C is a partial cross sectional view illustrating a state at a step of a process to form carbon nanotubes on a conductive member of a substrate.
Figure 5D:
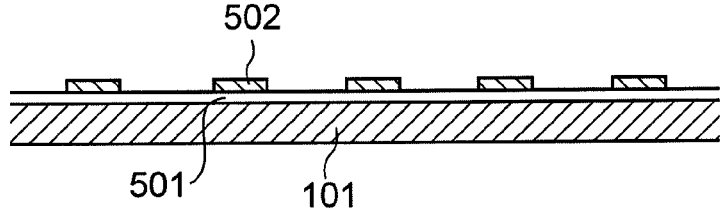
FIG. 5D is a partial cross sectional view illustrating a state at a step of a process to form carbon nanotubes on a conductive member of a substrate.
Figure 5E:
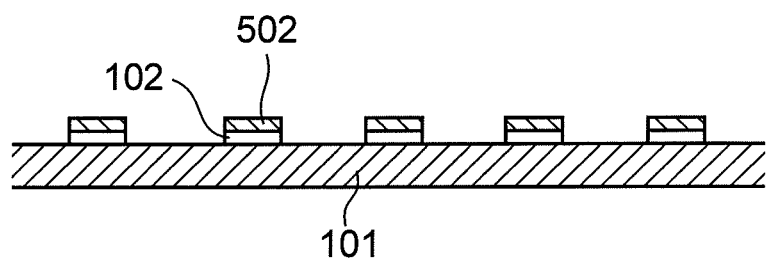
FIG. 5E is a partial cross sectional view illustrating a state at a step of a process to form carbon nanotubes on a conductive member of a substrate.

The substrate 101 is provided (FIG. 5A) and Mo is sputtered on the surface of the substrate 101, forming a conductive layer 501 (FIG. 5B). The thickness of the conductive layer 501 becomes the thickness of the conductive member 102, typically, about 10 nm to 100 nm.

Figure 5F:
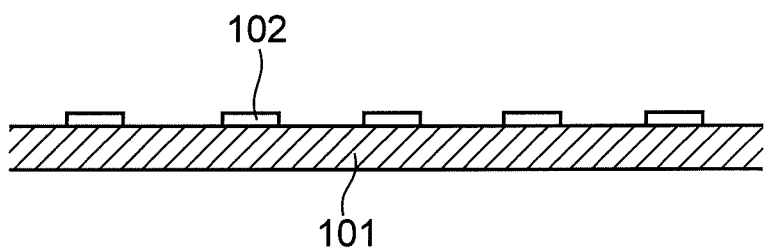
FIG. 5F is a partial cross sectional view illustrating a state at a step of a process to form carbon nanotubes on a conductive member of a substrate.

Next, a resist 502 is applied to the surface of the conductive layer 501 (FIG. 5C), a mask pattern of the conductive member 102 as illustrated in FIG. 4 is formed and is subject to exposure (FIG. 5D), the conductive layer 501 is subject to etching (FIG. 5E), and the resist 502 is removed (FIG. 5F).

Figure 5G:
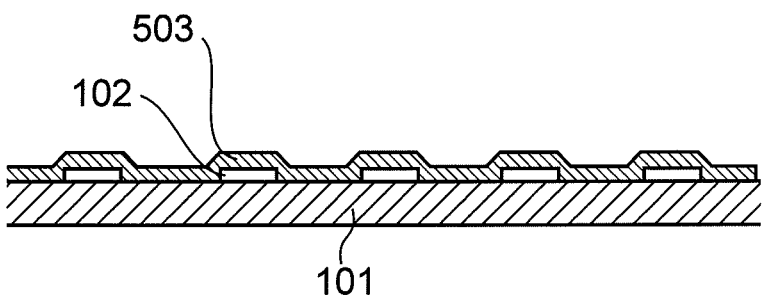
FIG. 5G is a partial cross sectional view illustrating a state at a step of a process to form carbon nanotubes on a conductive member of a substrate.

Then, $Al_2O_3$ is sputtered to become the catalyst support 503 (FIG. 5G). As illustrated in FIG. 5G, the catalyst support 503 covers the whole of the substrate 101 and conductive member 102.

Figure 5H:
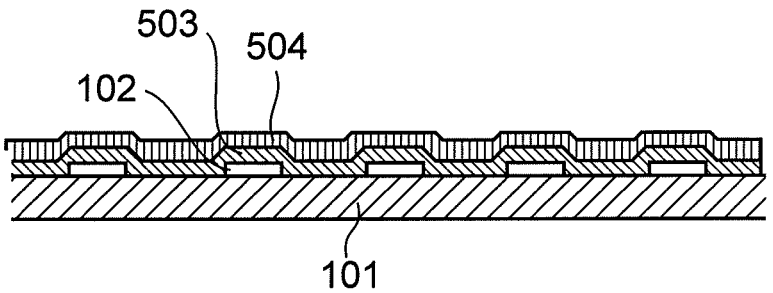
FIG. 5H is a partial cross sectional view illustrating a state at a step of a process to form carbon nanotubes on a conductive member of a substrate.

Next, Fe or Co is sputtered to become the catalyst 504 (FIG. 5H). The catalyst 504 covers the whole of the catalyst support 503.

In this way, the conductive member 102 is deposited on the surface of the substrate 101, the catalyst support 503 is disposed on the surface of the conductive member 102, and the catalyst 504 is disposed on the surface of the catalyst support 503. Next, the resulting substrate 101 is placed in a gas atmosphere containing a carbon source such as $C_2H_2$, and the conductive member 102 is subject to heating once in a pulse-like manner, thereby performing chemical vapor deposition (CVD).

Figure 5I:
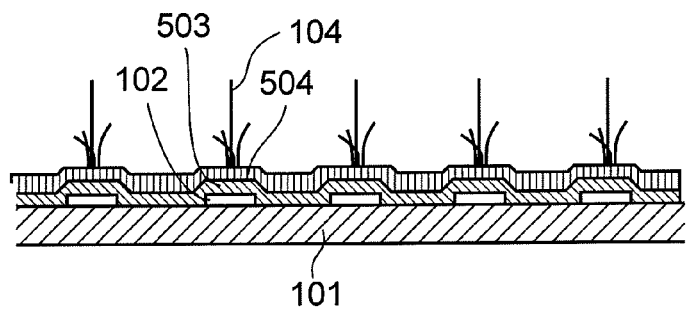
FIG. 5I is a partial cross sectional view illustrating a state at a step of a process to form carbon nanotubes on a conductive member of a substrate.

During this time period, thin carbon nanotubes 104 grow from a portion of the surface of the catalyst 504 that is adjacent to the conductive member 102 (FIG. 5I).

A typical heating method is to apply a voltage between the pad 401a and pad 401b of the conductive member 102 in a pulse-like manner to make an electrical current flow through the thin lines 403. Heating can be performed also by exposing the conductive member 102 to electromagnetic waves such as microwaves in a pulse-like manner.

The temperature and time of heating and the density of the carbon-source gas can be set by applying the technology disclosed in Non-patent literature 2. The size and length of each of the carbon nanotubes 104 can be set to be within desired ranges by performing a preliminary experiment. A short time of heating of about 0.01 second to 10 seconds is typically employed.

Temperatures of conductive member 102, catalyst support 503 and catalyst 504 rapidly become high by heating whereas the temperature of the substrate 101 does not immediately become high since it is thick and has low thermal conductivity. Therefore, if the heating time is short as described above, the substrate 101 virtually does not become degraded by heating.

Another method can be employed in which, after growth of the carbon nanotubes 104, a thin layer of about 1 nm to 5 nm of a conductive substance, such as ZnO, with a high oxidation resistance and a low surface tension is formed on the surface of the carbon nanotubes 104, and typically other exposed surface as a protective layer against oxidation and damages.

The formed carbon nanotubes 104 typically have a structure in which a thin carbon nanotube having a single wall to triple walls are tangled, unlike thick carbon nanotubes used in a conventional planar light-emitting device. In this case, since the tip of each of the carbon nanotubes 104 is sharp, electric field concentration occurs. Accordingly, when planar light-emitting is generated, the required voltage applied between the anode electrode and cathode electrode can be low.

Since each of the carbon nanotubes is thin, electric field concentration can effectively occur even if the length of each of the carbon nanotubes 104 is short.

This can reduce the spacing between the anode electrode and cathode electrode (typically, about 0.1 µm to 100 µm), thereby realizing a high resolution.

If the film thickness of the fluorescent material 105 is made to be thin to less or equal to 0.1 µm, the interval between the anode electrode and cathode electrode can be less or equal to 1 µm. In this case, the planar light-emitting device 11 can be driven under a gas pressure between 1 kPa and atmospheric pressure.

In the above procedures, the conductive layer 501 is formed, the resist 502 is applied thereon, a pattern of the conductive member 102 is formed by etching, and the resist 502 is removed. After that, the catalyst support 503 and catalyst 504 are sputtered. This order can be properly changed.

For example, the following procedures can be employed. That is, the conductive layer 501 is formed, the same material as that of the catalyst support 503 is sputtered to form a layer, and the same material as that of the catalyst 504 is sputtered to form a layer. After that, the resist 502 is applied, etching is performed to make patterns of the conductive member 102, catalyst support 503 and catalyst 504, and then the resist 502 is removed. In this case, since the catalyst support 503 and catalyst 504 are disposed in the same pattern as that of the conductive member 102, a portion of the substrate 101 is exposed.

In this case, since the portion of the substrate 101 that is covered with the catalyst support 503 and catalyst 504 decreases, the amount of light that passes through the substrate 101 increases.

Another procedure can be employed, in which the conductive layer 501 is formed, the same material as that of the catalyst support 503 is sputtered to form a layer, the resist 502 is applied, etching is performed to form the patterns of the conductive member 102 and catalyst support 503, the resist 502 is removed, and the catalyst 504 is sputtered. In this case, although the catalyst support 503 is disposed in the same pattern as that of the conductive member 102, the catalyst 504 covers the substrate 101.

In this case, even if the catalyst support 503 covers a portion of the substrate 101 beyond the conductive member 102 or the catalyst 504 covers a portion of the conductive member 102 or substrate 101 beyond the catalyst support 503, the carbon nanotube 104 can be made to grow as long as these are adjacent to each other.

Figure 6:
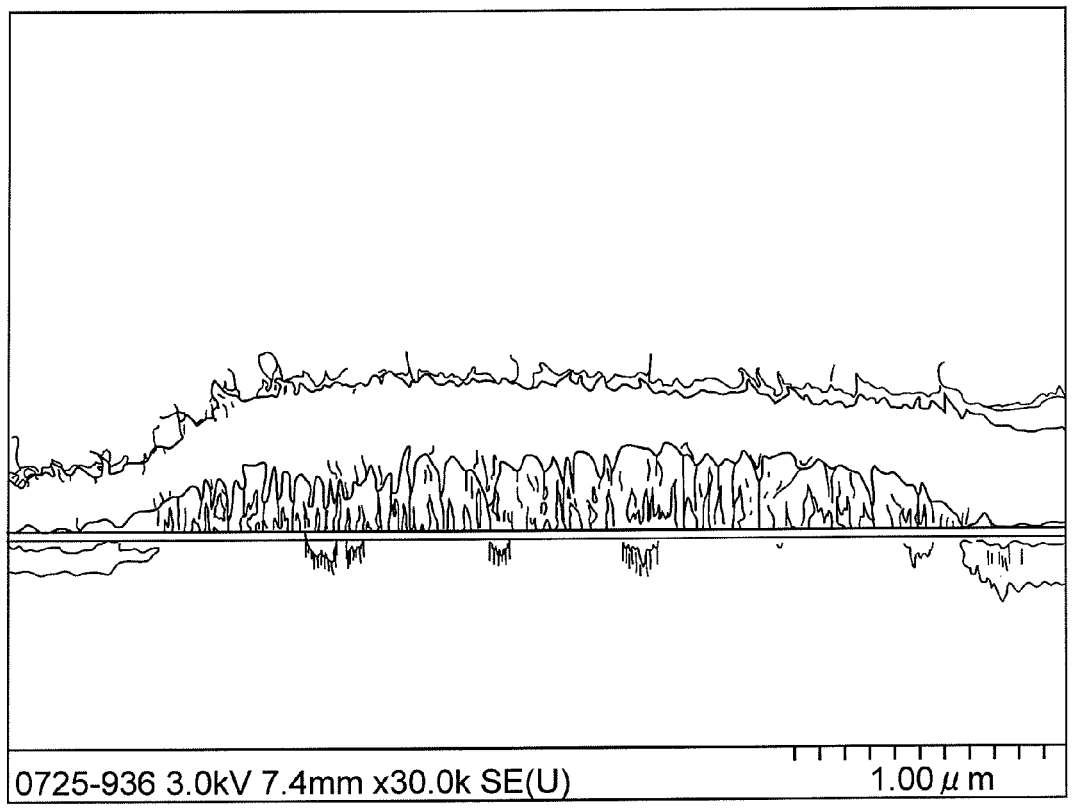
FIG. 6 is a SEM photograph illustrating a state of carbon nanotubes growing on thin lines of a conductive member by pulse heating CVD.

FIG. 6 is a scanning electron microscope (SEM) photograph illustrating a state of the carbon nanotubes 104 that are made to grow on the thin lines 403 of the conductive member 102 by one-second pulse heating CVD according to the above technology. Reference numerals are not shown in FIG. 6.

In the example illustrated in FIG. 6, each of the thin lines 403 has a width of about 3 µm. Degrees of growth of the carbon nanotubes 104 are significantly different from each other between the area on the right and left edges of the photograph where the thin lines 403 are not disposed and the area on the center portion of the photograph where the thin lines 403 are disposed, and therefore, this cross sectional view has a shape like "a high hill" or "a high plateau" on the thin lines 403.

Especially, on the thin lines 403, the length of each of the carbon nanotubes 104 is about 0.5 µm to 1.0 µm, and can sufficiently function as an emitter of the planar light-emitting device 11.

FIG. 6 also shows that each of the grown carbon nanotubes 104 is extremely thin, that is, they have a structure in which thin carbon nanotubes with a single wall to triple walls are tangled, entwined with each other.

Figure 7:
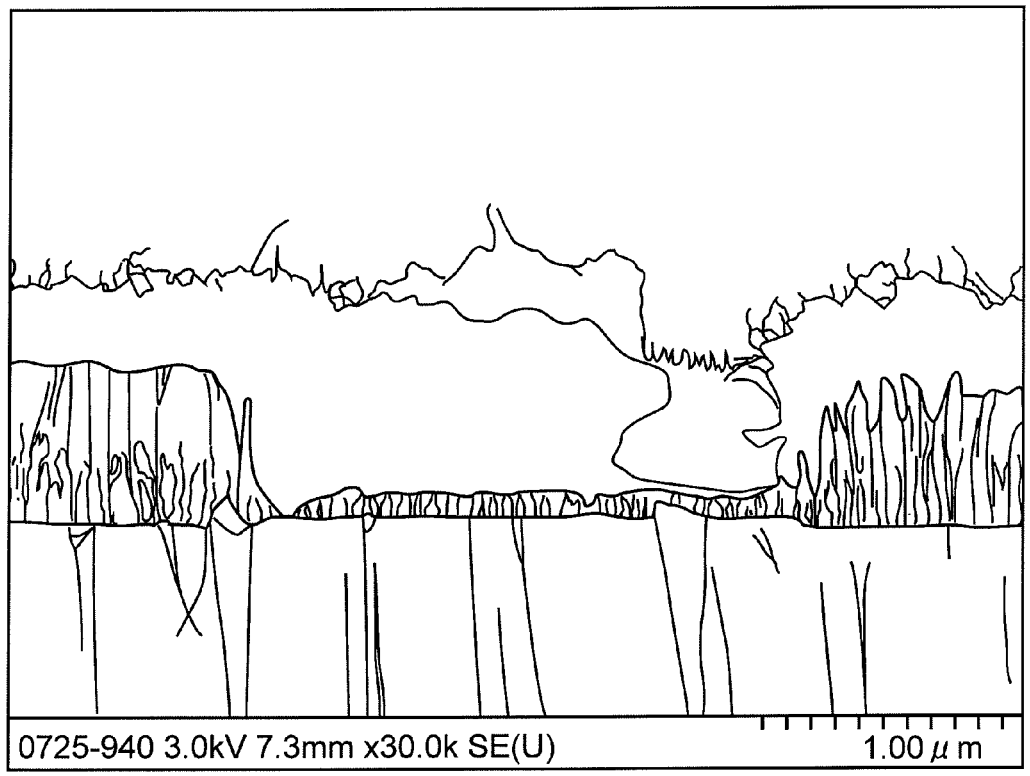
FIG. 7 is a SEM photograph illustrating a state of carbon nanotubes growing on thin lines of a conductive member by pulse heating CVD.

FIG. 7 is a SEM photograph illustrating a state of the carbon nanotubes 104 that are made to grow on the thin lines 403 of the conductive member 102 by one-second pulse heating CVD under conditions different to those of FIG. 6. Reference numerals are not shown in FIG. 7.

In the example illustrated in FIG. 7, the thin lines 403 are disposed in the center of the photograph and the width of each of the thin lines 403 is about 2 µm, and other factors are the same as those of FIG. 6 Degrees of growth of the carbon nanotube 104 are significantly different from each other between the area on the right and left edges of the photograph where the thin lines 403 are not disposed and the area on the center portion of the photograph where the thin lines 403 are disposed, and therefore, this cross sectional view has a shape like "a valley" or "a gorge" in which the thin lines 403 are low.

That is, growth of the carbon nanotube is about 0.1 µm on the thin lines 403 whereas growth of the carbon nanotube is about 0.7 µm to 0.9 µm on both sides of the region of the thin lines 403.

In the growth condition of FIG. 7, the heating temperature of the thin lines 403 is higher than in the growth condition of FIG. 6. Therefore, it is considered that the region adjacent to the thin lines 403 of the catalyst 504 except for on the thin lines 403 has a temperature suitable for growth of the carbon nanotubes 104. In this mode, since the corner of the ensemble (aggregate) of the carbon nanotubes 104 is sharp, emission is deemed to be good.

Figure 8:
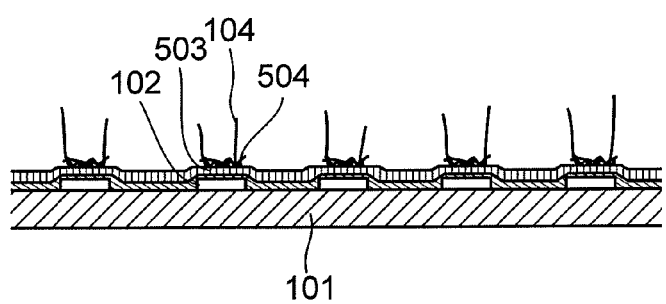
FIG. 8 is an illustration showing a state of growth of carbon nanotubes suitable for an application.

FIG. 8 is an illustration to show a state of growth of the carbon nanotubes 104 suitable for the application. A description will be made below with reference to FIG. 8.

In FIGS. 2 and 3, for easier understanding, the length of each of the carbon nanotubes 104 and the density of the carbon nanotubes 104 are illustrated in an exaggerated form. In some cases, it is desirable that the density of the carbon nanotubes 104 is sparse to some extent depending on the application, including a field emission. In the example illustrated in FIG. 8, the carbon nanotubes 104 are sparsely formed, thereby effectively realizing electric field concentration.

In this way, the density of the carbon nanotubes 104 and the length of each of the carbon nanotubes 104, the position of growth of the carbon nanotubes 104 on the surface of the catalyst 504 (on the thin lines 403, outside the thin lines 403, and so on) and so on can be adjusted by properly changing various conditions such as the voltage applied by pulse heating, the time length of a pulse, the width and length of each of the thin lines 403 and the width of each of the slits 451.

Figure 9:
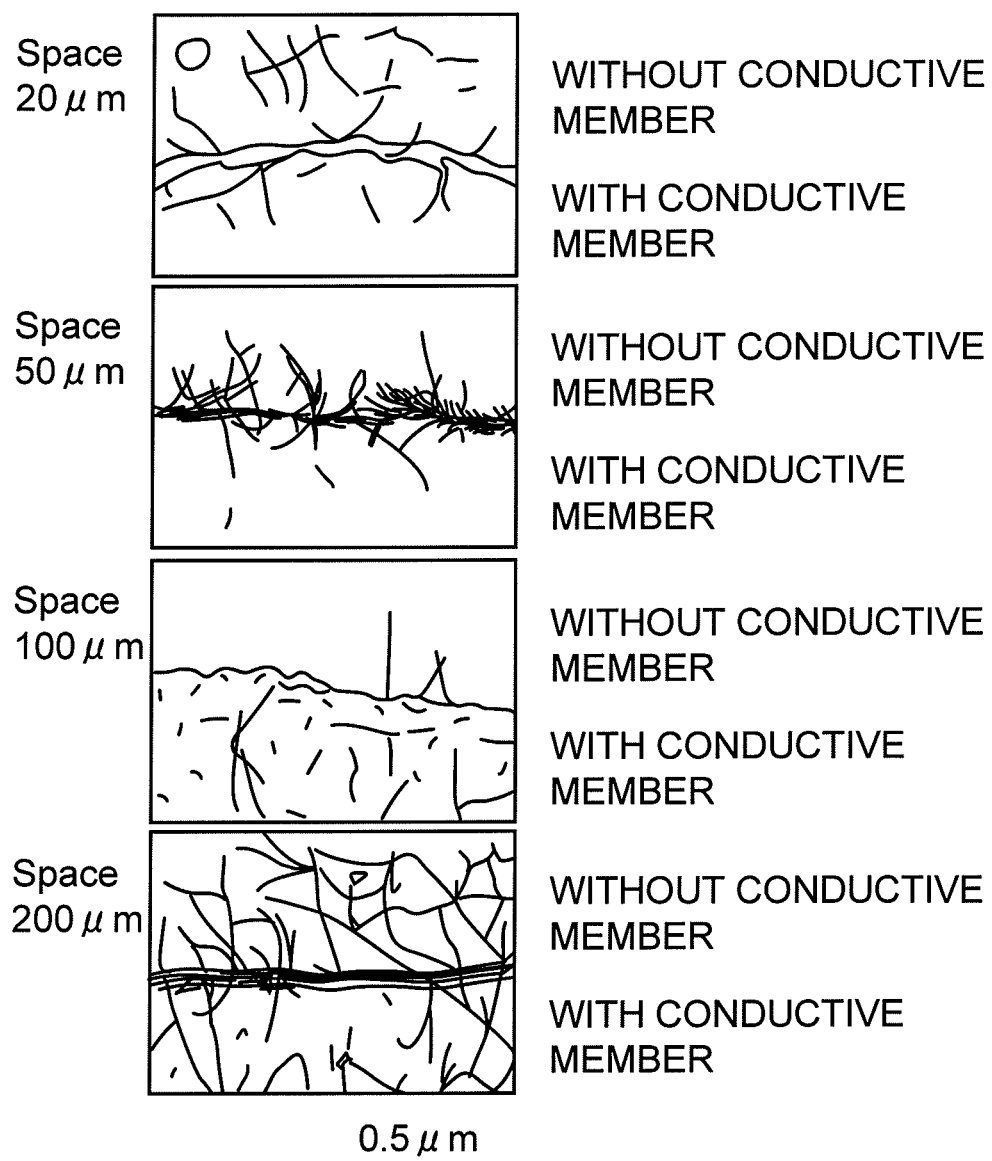
FIG. 9 is SEM photographs illustrating states of grown carbon nanotubes.

FIG. 9 are SEM photographs illustrating grown carbon nanotubes. These photographs are examples of the carbon nanotubes 104 illustrated in FIG. 8. A description will be made with respect to FIG. 9.

FIG. 9 illustrate growth of the carbon nanotubes 104 in predetermined conditions when the interval between the thin lines 403 (a region "with a conductive member" in FIG. 9) of the conductive member 102, that is, the width of each of the slits 451 (a region "without a conductive member" in FIG. 9) is 20 µm, 50 µm, 100 µm or 200 µm.

If the interval is 20 µm or 50 µm, the conductive members 102 are close to each other and therefore heat the region of the slits 451. Therefore, the carbon nanotubes 104 grow, not on the conductive member 102, but at the periphery thereof.

If the interval is 100 µm or 200 µm, the temperature of the conductive member 102 is lower than the above. Therefore, the carbon nanotubes grow on the conductive member 102.

Relationships between various factors of the prototype planar light-emitting device 11 and emission performance, and the applied voltage and the electrical current will be described below.

On the glass substrate 101, a 100 nm thickness of Mo layer was formed as the conductive member 102, a 20 nm thickness of $Al_2O_3$ layer was formed as the catalyst support 503, and a 1 nm thickness of Fe layer was formed as the catalyst 504.

As patterns of the conductive member 102, the width of each of the thin lines 403 was 2 µm, the length of each of the thin lines 403 was 2 mm, and the interval (space) of the thin lines 403 had four types: 20 µm, 50 µm, 100 µm and 200 µm.

As a carbon-source gas, a mixed gas of 4 Torr (533 Pa) of $C_2H_2$, 200 Torr (26.6 kPa) of $H_2$ and 556 Torr ($\approx$74.1 kPa) of Ar was used.

A 100 V voltage was applied for two seconds to heat the conductive member 102.

The film thickness of the fluorescent material 105 was about 10 µm, and the space between the substrate 101 and fluorescent material 105 was 150 µm. A reflection-type mode illustrated in FIG. 3 was employed to manufacture the planar light-emitting device 11 by way of trial. Then, under a gas pressure of $0.7 \times 10^{-5}$ Pa, an AC voltage having a duty ratio of 1/2 and a frequency of 100 Hz was applied to between the anode electrode and the cathode electrode. The resultant state of emission was observed.

Figure 10:
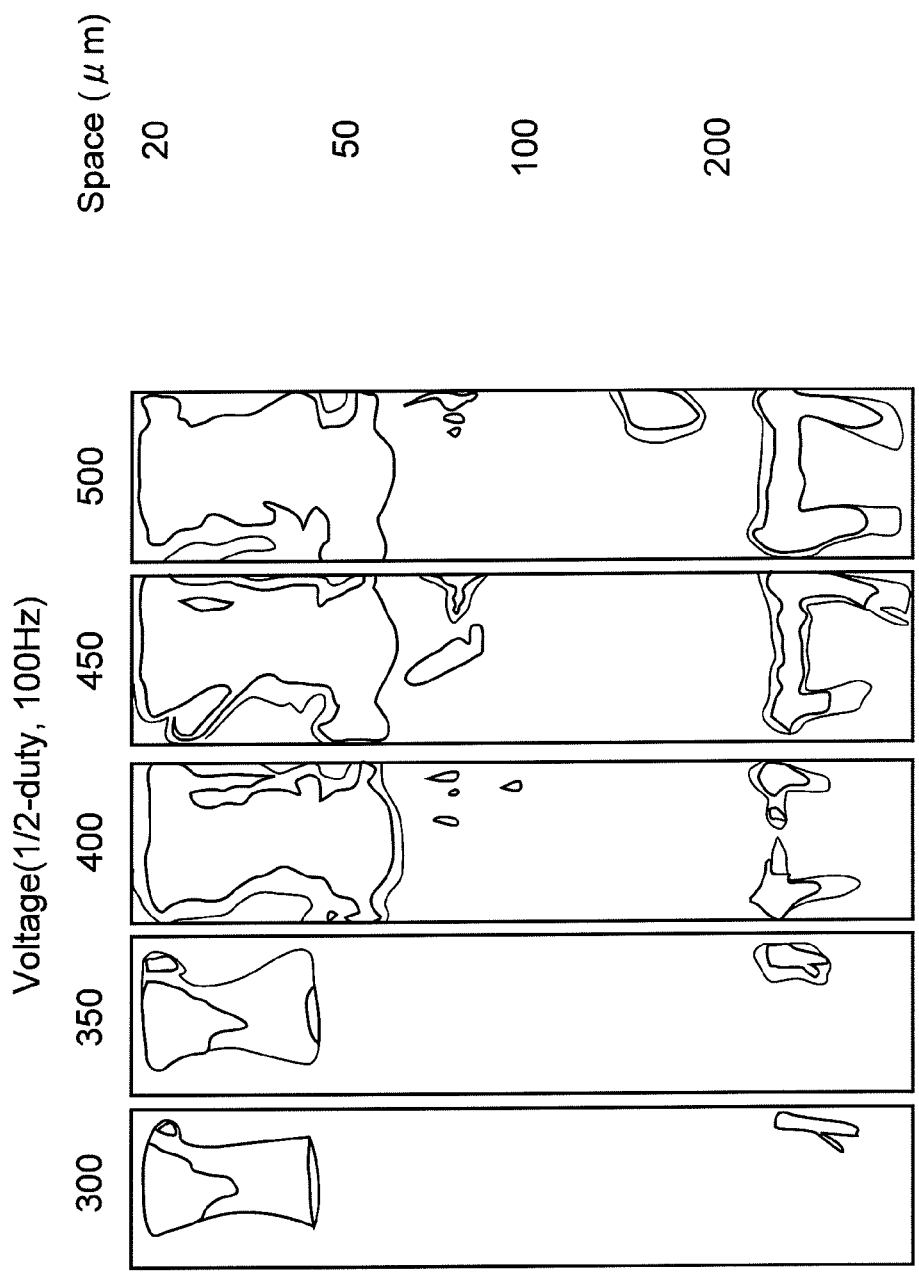
FIG. 10 is photographs of light emitting states of a prototype planar light-emitting device.
Figure 11:
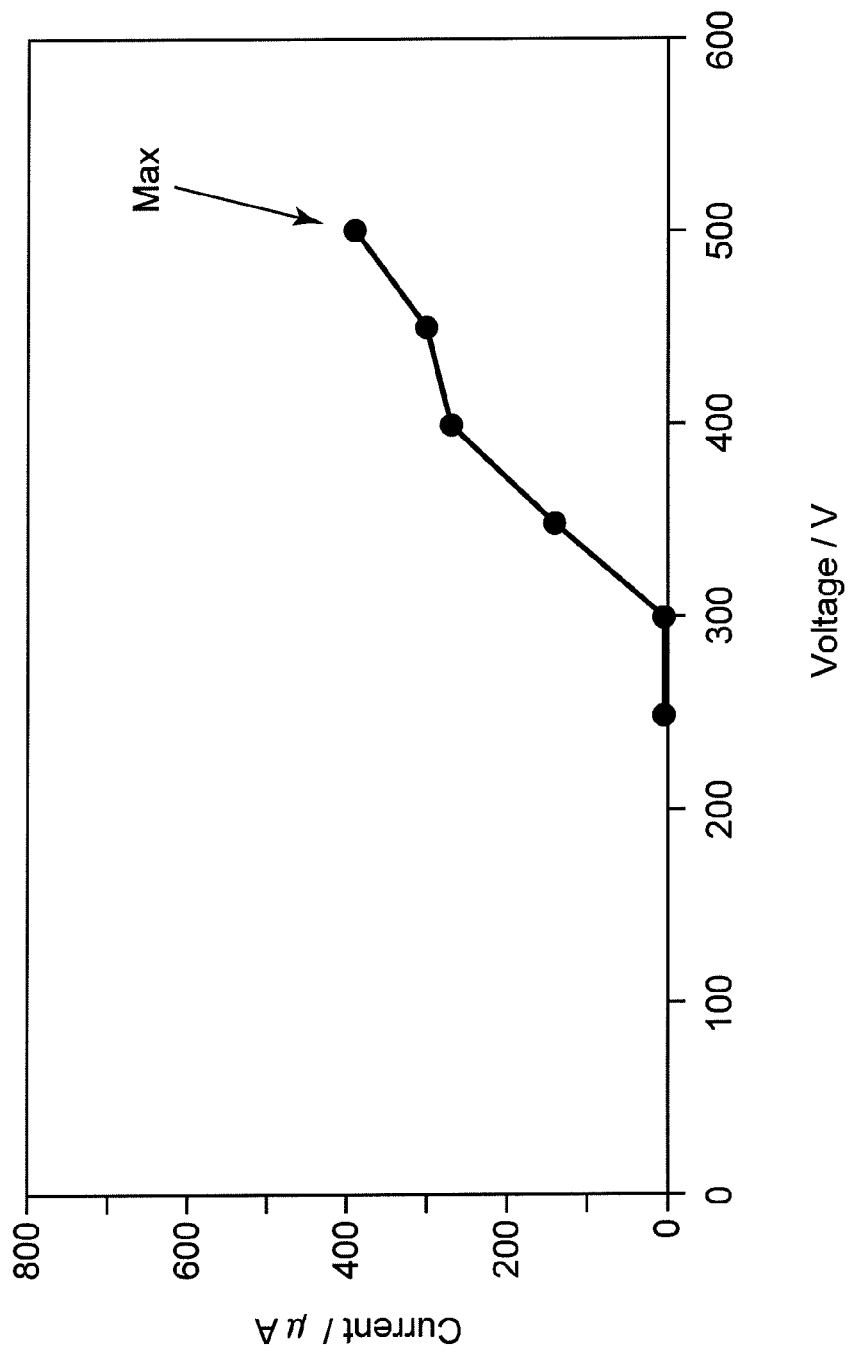
FIG. 11 is a graph illustrating a relation between a voltage applied to a planar light-emitting device and a current.

FIG. 10 is a photograph showing emission of the planar light-emitting device 11 formed in this way. FIG. 11 is a graph illustrating the relationship between the voltage applied to the planar light-emitting device 11 and the electrical current. A description will be made with reference to FIG. 10.

As illustrated in FIG. 10, the luminance of emission is the highest when the interval (space) between the thin lines 403 is 20 µm, or when the applied voltage is 500 V. That corresponds to the case in which the voltage (Voltage/V) for obtaining the highest electrical current (current/µA) is 500 V in the graph illustrated in FIG. 11. The electrical current in this case is about 400 µA.

Results of trials employing various factors will be described below.

The carbon nanotubes 104 were formed employing 1.3 mm thickness of soda lime glass as the substrate 101. The heating time was one second, and the initial heating power by applying the voltage had four types: 2.4 MW/m², 2.6 MW/m², 3.0 MW/m², and 3.2 MW/m².

The resulting temperatures were 812 K, 825 K, 880 K and 910 K, respectively, in the above order.

At 2.4 MW/m² and 2.6 MW/m², the substrate 101 did not have a crack; at 3.0 MW/m², the conductive member 102 separated from the substrate 101; and at 3.2 MW/m², a crack was generated in the substrate 101.

The carbon nanotubes 104 did not grow at 2.4 MW/m² whereas they grew at 2.6 MW/m², 3.0 MW/m² and 3.2 MW/m².

Therefore, in this case, it is suitable that the initial heating power be 2.6 MW/m².

The carbon nanotubes 104 were formed, employing 2.8 mm thickness of glass with a high strain point (AGC PD200) as the substrate 101. Using an initial heating power by application of the voltage and heating time, three cases were employed: 4.0 MW/m² for one second, 4.5 MW/m² for one second, and 4.0 MW/m² for two seconds.

The resulting temperatures are 900 K, 1050 K, and 1190 K, respectively, in the above order.

As a result, in all the cases, although carbon nanotubes 104 grew, a crack was generated in the substrate 101 at 4.0 MW/m² for two seconds and the conductive member 102 separated from the substrate 101 at 4.5 MW/m² for one second.

Accordingly, in this case, it is suitable that 4.0 MW/m² and one second be employed.

In addition to the above, with respect to the growth state of each of the four carbon nanotubes 104 illustrated in FIG. 9, emission was observed. The experiment showed that an emitter having a 20 µm or 50 µm interval in which the carbon nanotubes 104 grow adjacent to the conductive member had a higher emission performance than an emitter having a 100 µm or 200 µm interval in which the carbon nanotubes 104 grow on the conductive member 102.

This application claims the priority right of Japanese Patent Application No. 2008-278869 (applied on Oct. 29, 2008), and the content disclosed in the basic application and the prior art presented in this application are incorporated herein, as long as the laws of the designated state allow.

Industrial Applicability

The present invention can provide a method for forming carbon nanotubes, that is suitable for forming carbon nanotubes on a conductor covering a portion of a substrate in a short heating time.

Explanation of Reference Numerals 10 liquid crystal display
11 planar light-emitting device
12 polarization filter
13 transparent electrode
14 crystal liquid
15 transparent electrode
16 color filter
17 polarization filter
101 substrate
102 conductive member
103 conductive sheet body
104 carbon nanotube
105a fluorescent material
401 pad
402 core electrode
403 thin line
451 slit
501 conductive layer
502 resist
503 catalyst support
504 catalyst

The invention claimed is:

1. A method for forming carbon nanotubes comprising the processes of:
depositing a conductive member covering a portion of a surface of a substrate;
disposing a catalyst on the conductive member;
placing the substrate on which the catalyst has been disposed in a carbon-source gas atmosphere; and
generating heat with the conductive member deposited on the substrate placed in the carbon-source gas atmosphere for a short enough heating time that allows for growing carbon nanotubes on the catalyst but avoids causing thermal damage to the substrate and avoids damage to the conductive member.

2. The method for forming carbon nanotubes according to claim 1,
wherein the process of depositing the conductive member includes covering a portion of the surface of the substrate by depositing the conductive member in a linear pattern, a comb pattern or a mesh pattern,
wherein the catalyst covers the conductive member and portions of the surface of the substrate not covered by the conductive member, and
wherein nanotubes are grown from those portions of the catalyst that extend over the conductive member.

3. The method for forming carbon nanotubes according to claim 2,
wherein the process of depositing the conductive member includes disposing conductive thin lines, each having a width of 1 µm to 50 µm, with an interval of 10 µm to 500 µm to make the linear pattern, the comb pattern or the mesh pattern.

4. The method for forming carbon nanotubes according to claim 3,
wherein the process of depositing the conductive member includes depositing Mo as the conductive member, and
the process of disposing the catalyst includes disposing $Al_2O_3$ as a catalyst support in such a way that the $Al_2O_3$ contacts the conductive member and disposing Fe or Co as the catalyst so that the Fe or Co contacts the catalyst support.

5. The method for forming carbon nanotubes according to claim 1,
wherein the substrate is made of glass or transparent material, and
in the process of heating, a length of the heating time is equal to or less than ten seconds.

6. The method for forming carbon nanotubes according to claim 1,
wherein the generating heat step comprises passing a short pulse of electric current from a first end of the conductive member to a second end of the conductive member, and
electrons move between at least one of the first and second ends of the conductive member and the carbon nanotubes when the carbon nanotubes function as an electronic device.

7. The method for forming carbon nanotubes according to claim 1,
wherein the generating heat step comprises applying a short pulse of voltage between a first end of the conductive member and a second end of the conductive member, and
a same voltage is applied to the first and second ends of the conductive member when the carbon nanotubes function as an electronic device.

8. The method for forming nanotubes according to claim 1, wherein the nanotubes remain in electrical communication with the conductive member.

9. The method for forming carbon nanotubes according to claim 1,
wherein the generating heat step comprises passing a short pulse of electric current from a first end of the conductive member to a second end of the conductive member.

10. The method for forming carbon nanotubes according to claim 1,
wherein the generating heat step comprises applying a short pulse of voltage between a first end of the conductive member and a second end of the conductive member.

11. The method for forming nanotubes according to claim 10, wherein the substrate is comprised of either glass or plastic.

12. The method for forming nanotubes according to claim 10, wherein the substrate is comprised of soda-lime glass.

13. The method for forming nanotubes according to claim 1, wherein said substrate is transparent, translucent or opaque.

14. A method for forming carbon nanotubes comprising the processes of:
depositing a conductive member covering a portion of a surface of a substrate;
disposing a catalyst on the conductive member;
placing the substrate on which the catalyst has been disposed in a carbon-source gas atmosphere; and generating heat with the conductive member deposited on the substrate placed in the carbon-source gas atmosphere by irradiating such a short pulse of electromagnetic wave onto the conductive member that a temperature of the substrate is kept below a heatproof temperature of the substrate during the process of heating, to make carbon nanotubes grow from the catalyst.

15. A method for forming carbon nanotubes comprising the processes of:
   depositing a conductive member covering a portion of a surface of substrate;
   disposing a catalyst support on the conductive member and a catalyst on the catalyst support;
   placing the substrate on which the catalyst has been disposed in a carbon-source gas atmosphere; and
   generating heat with the conductive member deposited on the substrate placed in the carbon-source gas atmosphere for a short time to make carbon nanotubes grow from the catalyst.

16. The method for forming carbon nanotubes according to claim 15,
   wherein during the generating heat step, a temperature of the substrate is kept below a heatproof temperature of the substrate.

17. A method for forming carbon nanotubes comprising the processes of:
   depositing a conductive member covering a portion of a surface of a substrate;
   disposing a catalyst on the conductive member;
   placing the substrate on which the catalyst has been disposed in a carbon-source gas atmosphere; and
   generating heat with the conductive member deposited on the substrate placed in the carbon-source gas atmosphere to make carbon nanotubes grow from portions of the catalyst that is adjacent to the conductive member,
   wherein during the generating heat step, a temperature of the substrate is kept below a heatproof temperature of the substrate.

* * * * *